Aug. 17, 1965     C. E. ADAMS     3,200,832
ELECTROHYDRAULIC FLOW CONTROL APPARATUS
Original Filed April 4, 1961
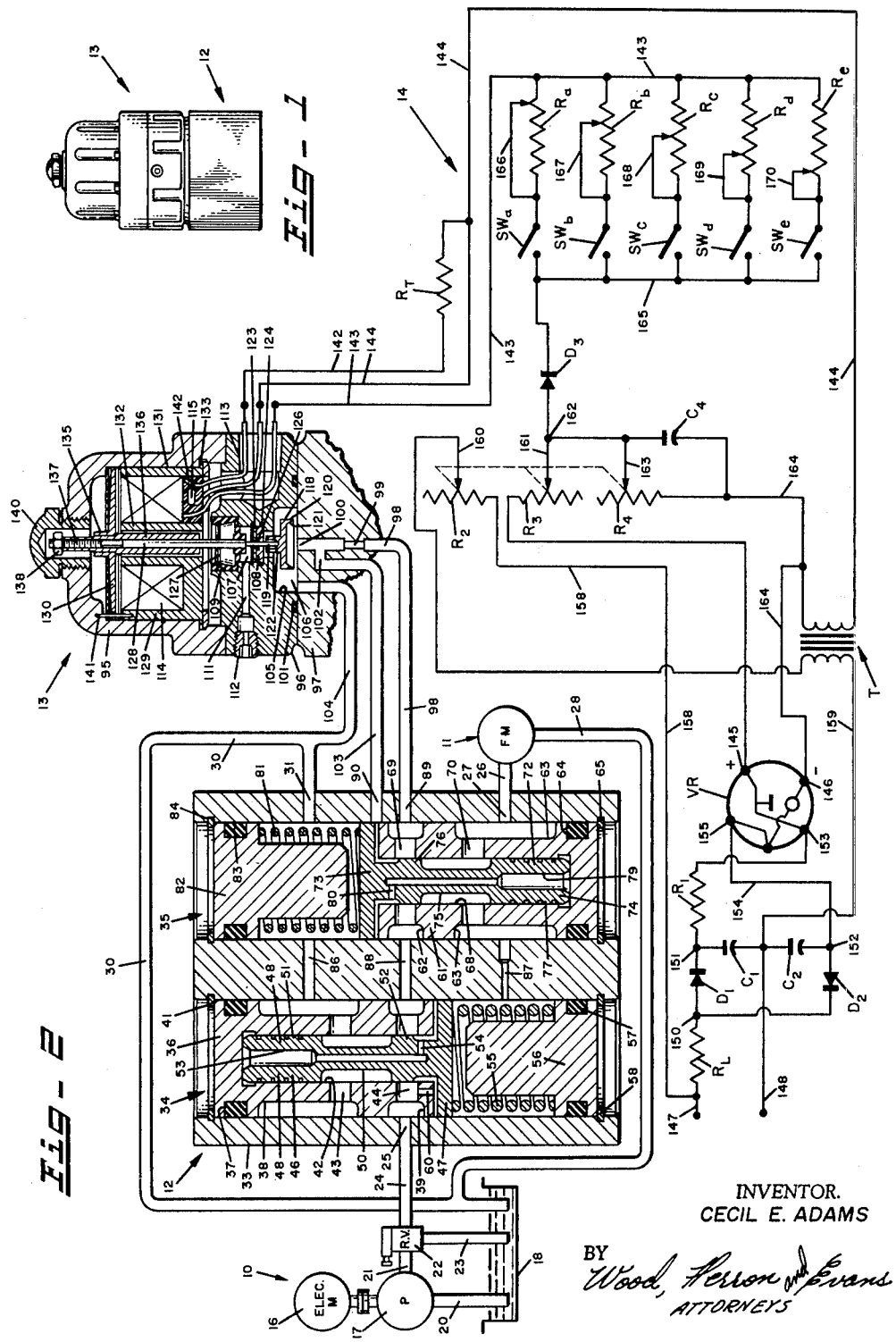
INVENTOR.
CECIL E. ADAMS
BY
Wood, Herron & Evans
ATTORNEYS

United States Patent Office 3,200,832
Patented Aug. 17, 1965

3,200,832
ELECTROHYDRAULIC FLOW CONTROL
APPARATUS
Cecil E. Adams, Columbus, Ohio, assignor to American
Brake Shoe Company, New York, N.Y., a corporation
of Delaware
Original application Apr. 4, 1961, Ser. No. 100,753, now
Patent No. 3,159,178, dated Dec. 1, 1964. Divided
and this application Oct. 24, 1963, Ser. No. 318,676
6 Claims. (Cl. 137—117)

This invention relates to apparatus for adjustably controlling the rate of flow of hydraulic fluid under pressure. More particularly, the invention relates to electrically controllable apparatus for adjustably regulating the rate of flow of hydraulic fluid under variable pressure conditions. This application is a division of my copending application Serial No. 100,753, filed April 4, 1961, now Patent No. 3,159,178.

Devices for regulating the flow of hydraulic fluid have utility for a wide variety of purposes. For example, such devices are commonly employed to permit only a fixed number of gallons of fluid per minute to flow to a hydraulic motor, thereby maintaining the speed of rotation of the motor at a fixed number of revolutions per minute. As another example, it is often desirable to admit fluid at a constant flow rate to the cylinder of a hydraulic ram so that the ram will advance at constant speed regardless of variations it may encounter in the resistance presented to it by a work piece.

While there have heretofore been available flow control devices which permit adjustment or change in the volume of flow which they permit to pass in unit time, it has usually been necessary to make such adjustments manually, as by loosening a lock nut, changing the relative position of an orifice-forming element, and then retightening the nut. For obvious reasons, it has been difficult to make such adjustments remotely. Moreover, it has been difficult quickly to set previous flow control devices to maintain the flow rate at any preselected numerical value. For example, if it is desired, say, to maintain a flow rate of 4 gallons per minute to a hydraulic motor, the flow control apparatus must usually be set so that the flow rate will approximate the desired value. With the apparatus thus set, the actual flow must then be measured and the setting of the apparatus "inched" to a better approximation of the desired rate. That this type of adjustment has been difficult to effect remotely can also be appreciated.

In contrast to such past devices, this invention is directed to flow control apparatus which is electrically controllable and by which the flow rate may be set at any desired value quickly, remotely, and accurately.

In accordance with one embodiment of the invention, the rate of flow of fluid under pressure to a work load may be set at any desired value within a preselected operating range simply by regulating the current supplied to an electromechanical control element. This flow rate will thereafter be maintained regardless of variations or fluctuations either in the pressure of the fluid supplied to the flow control apparatus or in the resistance encountered at the work load.

Broadly speaking, in a main aspect, the flow control apparatus of this invention includes structure forming a main orifice, structure forming a pilot or trimmer orifice, fluid passageways through which fluid under pressure is supplied to the respective inlets of the main and pilot orifice structure, and pressure differentially operated means whereby the pilot or trimmer orifice structure is rendered effective to control the total flow of fluid through the flow control apparatus to an output or load conduit.

More specifically, in a preferred form the invention comprises a main flow orifice assembly, a pressure regulator assembly, and a trimmer or pilot valve. The main flow orifice assembly includes a body having an inlet port and an outlet port and structure forming an adjustable or variable orifice between those ports the area of which can be varied. The pressure regulator assembly maintains a constant pressure differential or pressure drop between the pressure of fluid at the inlet and outlet ports of the main flow orifice assembly. The trimmer or pilot valve includes a body having a bore, an inlet port and an outlet port, a movable valve member for esetablishing a pressure drop between the inlet and outlet ports, and an electromechanical transducer for actuating the valve member which delivers a substantially constant force for a given electrical input thereto in a direction tending to close the pilot valve. A fluid passageway including a flow restrictor communicates between the inlet port of the main flow orifice assembly and the inlet port of the trimmer or pilot valve, and other means interconnect the pilot valve with the main flow orifice assembly in such manner that the pilot valve is rendered effective to control the total flow delivered by the flow control apparatus to an output or load conduit.

These and other aspects of the invention may best be described by reference to the accompanying drawings, in which:

FIGURE 1 is a side elevation of a preferred flow control apparatus in accordance with the invention; and FIGURE 2 is a schematic diagram of a hydraulic system incorporating a three-port electrohydraulic flow control apparatus for operating a fluid motor, including a cross-sectional view of an electrohydraulic pilot valve, a schematic view of an electronic circuit for controlling the operation of the pilot valve, and a cross-sectional view of a flow metering mechanism responsive to the pilot valve for regulating the flow of fluid to the work load.

In FIGURE 2 of the drawings there is shown a system in accordance with a preferred embodiment of the invention for supplying hydraulic fluid under pressure to a work load at a controlled rate. The operation of this system is controlled by an electrical input supplied to it. It can be set, by closing an appropriate switch, to provide any of a number of preselected operating ranges over each of which the rate of flow can be either gradually varied or set at any value in the range simply by adjusting a variable resistor.

Broadly speaking, the system of FIGURE 2 includes a source 10 of fluid under pressure, a work load 11 which for purposes of illustration is taken to be a fluid motor, a flow metering mechanism or assembly 12 connected between the source of fluid 10 and the work load 11 for controlling the flow to the load, an electrically operated pilot valve 13 which governs the flow rate maintained by the flow metering assembly 12, and an electric circuit 14 for operating and controlling the pilot valve 13.

Referring to the figure in detail, the source of fluid pressure 10 is conventional and may comprise an electric motor 16 driving a hydraulic pump 17. The pump receives hydraulic fluid from a tank 18 through a conduit 20, and discharges fluid under pressure into a conduit 21. This conduit 21 is connected to tank 18 through a relief valve 22 and a conduit 23. These elements 16–23 will be understood to represent a conventional source of fluid under pressure by which the work load 11 is operated.

A high pressure conduit 24 is connected from the relief valve 22 to the inlet port 25 of the flow metering assembly 12. A conduit 26 connects the load port 27 of the flow metering assembly 12 to the fluid motor 11, a conduit 28 connects the low pressure side of the fluid motor 11 to the tank 18, and another conduit 30 connects the tank port 31 of the flow metering apparatus to the tank 18. Thus, it will be seen that the arrangement described is of the "meter-in" type, in which the flow control mechanism is in series with (i.e., is connected directly to) the work load, and is further of the "three-port" type, in which the flow metering assembly diverts to tank that portion of the flow entering its inlet port which is in excess of the flow which is to be directed to the work load. As will be described more fully hereinafter, the function of the pilot valve 13 is to determine, in effect, what portion of the high pressure fluid entering the flow metering assembly 12 shall be metered to the fluid motor 11 through conduit 26 and what portion shall be diverted to the tank 18 through conduit 30.

*The flow metering assembly of FIGURE 2*

The flow metering assembly 12 is contained in a body 33 in the form of a block which is provided with two spaced, parallel vertical bores 34 and 35. Bore 34 contains elements which cooperate to form pressure compensating or regulating means, while bore 35 contains elements which cooperate to form a variable orifice by which the rate of flow of fluid to the load port 27 of the flow metering assembly is directly controlled or metered.

The elements contained within bore 34 include a cylindrical element 36 having spaced circumferential grooves 37, 38, and 39 formed therein, which is inserted into one of the open ends of bore 34 and is retained therein by a snap ring 41. The cylinder 36 is sealed to the bore by an O-ring contained within groove 37 which is adjacent snap ring 41. Cylinder 36 also includes a central axially extending bore 42 which extends upwardly toward but not through its upper end which is connected to grooves 38 and 39 by passages or ports 43 and 44 respectively.

A compound piston element 46 is also contained within bore 34 and includes a piston head 47 of diameter equal to that of the bore and a small diameter shank 48 which extends to and reciprocates within bore 42 of cylinder 36. This shank 48 is provided with a circumferential groove 50 and a pair of lands 51 and 52. Land 51 functions merely as a guide or bearing for the compound piston 46 and never closes port 43. Land 52 cooperates with port 44 to form a valve for controlling the flow of fluid through port 44 in accordance with the vertical position of the sharp upper peripheral edge of the land which is adjacent groove 50. The compound piston 46 is provided with a vertical bore 53 which extends downwardly from its upper end and communicates through a lateral drilling 54 to the upper side of the piston head 47.

The piston 46 is urged upwardly to the position shown in FIGURE 2 by a spring 55 which abuts the piston head 47 and a block 56. Spring 55 is a low rate spring; that is, the force it supplies when compressed is relatively independent of the degree of compression it has undergone. The block 56 is inserted into the other open end of bore 34, sealed by an O-ring 57, and is retained in the bore by a snap ring 58. The block 56 forms an abutment which limits the downward movement of the piston 46 in bore 34. The chamber formed in the bore between the upper face of the piston head 47 and the adjacent end of cylindrical element 36 is connected with groove 39 by a passage 60 formed in the cylindrical element and extending from port 44 to the bottom of element 36.

The other bore (35) in body 33 contains elements which form a variable orifice for metering the flow to load port 27. As can be seen from FIGURE 2, the elements contained in bore 35 are preferably generally similar to those contained within bore 34, with the exception that they are reversed or "upside-down" with respect to those of bore 34. Thus, bore 35 is provided with a cylinder 61 having spaced circumferential grooves 62, 63, and 64, and is sealed to and retained within bore 35 by an O-ring in groove 64 and a snap ring 65 at its lower end. This cylinder 61 is provided with a downwardly extending axial bore 68, ports 69 and 70 connecting grooves 62 and 63 respectively to this bore 68. A compound piston element 72, reversely oriented with respect to the corresponding piston 46 in bore 34, is slidably received in bores 35 and 68. This piston 72 has a head 73 which is sealingly slidable in bore 35 and shank 74 which extends into and reciprocates within bore 68. This shank 74 is provided with a circumferential groove 75 and lands 76 and 77. Land 76 cooperates with port 69 to form a valve for metering the flow of fluid to load port 27 in accordance with the vertical position of the sharp lower peripheral edge of land 76. Land 77 functions merely as a guide and never closes port 70. An upwardly extending small diameter bore 79 connects the lower end of shank 74 of compound piston 72 with the underside of piston head 73 through a lateral drilling 80.

The piston 72 is urged downwardly in bore 35 by a high rate spring 81, the force delivered by which depends sharply on its relative compression. This spring 81 abuts piston head 73 and a block 82 which is sealed and retained within bore 35 by an O-ring 83 and snap ring 84 respectively. A bore 86 connects the chamber formed by the wall of bore 34 and groove 38 of cylinder 36 with the control chamber formed by the wall of bore 35 and upper face of piston head 73; this latter chamber is connected through tank port 31 to tank conduit 30. A bore 88 connects the chamber formed by the wall of bore 34 and groove 39 in cylinder 36 with the corresponding chamber of bore 35 formed within cylinder 61. A third bore 87 reflects the pressure of fluid in the outlet conduit 26 to the chamber in bore 34 which is below the lower face of piston head 47. Pilot valve ports 89 and 90 are formed in body 33 respectively entering the chamber in bore 35 bounded by groove 62 and the control chamber between the lower face of piston head 73 and the upper end of cylinder 61.

*The pilot valve of FIGURE 2*

As previously noted, the setting of the flow metering apparatus 12 is controlled by an electrohydraulic pilot valve 13. In FIGURE 2, pilot valve 13 is shown separately from the flow metering apparatus 12 for clarity, but in practice it is preferred to mount the pilot valve physically adjacent or on top of the flow metering apparatus in the manner shown in FIGURE 1.

The pilot valve 13 is housed in a body comprised of two elements 95 and 96 which are connected by screws not shown. The lower body element 96 is provided with a flat bottom surface for mounting atop a block 97 which, as explained, can in practice be contiguous with the flow metering apparatus 12. An O-ring 101 in a groove in the lower surface of body element 96 forms a seal with the top surface of block 97. An inlet passageway 98 extends from port 89 of the flow metering apparatus 12 through a restricted orifice 99 to the upper surface of block 97 where it forms an inlet or control port 100. A bore 102 enters bore 98 downstream of orifice 99 near inlet port 100 and is connected to a conduit 103 leading to pilot valve port 90 of the flow metering assembly. An outlet passageway 104 opens on the top surface of block 97 at a position spaced from inlet port 100 and is connected to tank conduit 30.

The lower body element 96 of the pilot valve is provided with a stepped vertical bore 105 which is axially aligned with port 100 in block 97 and which is enlarged at its lower end to communicate with the outlet passageway 104. This bore 105 is divided into two chambers, one a wet chamber 106 and the other a dry chamber 107, by a seal and guide assembly 108 and a diaphragm 109 is the form of a flexible boot. Bore 105 is joined below this boot 109 by a horizontally extending bore 111 which is partially closed by a breather or vent plug 112. Body element 96 is also provided with a passageway 113 through which pass insulated wires connected to the electric coil 114 and thermistor 115 of an electro-mechanical transducer assembly contained in body member 95.

A movable valve element or poppet 118 is contained within the wet chamber 106 and is mounted on the lower end of an operating rod 119 which extends through the seal and guide assembly 108. This valve element 118 has a large diameter head 120 provided with a downwardly extending peripheral flange 121 which tapers downwardly to a relatively sharp edge. Above head 120, valve element 118 is provided with a shank of small diameter in which is formed a cup 122 in which the lower end of operating rod 119 is loosely received. Together with port 100 of bore 98, poppet 118 forms a valve assembly which acts on fluid flowing from inlet port 100 to outlet passageway 104 to create a back pressure at port 100. The particular construction shown is preferred for this valve because it is self-cleaning and presents a relatively large area to the pressure of fluid at port 100, but it is contemplated that other suitable constructions may be employed.

The seal and guide assembly 108 includes a circular disk 123 having cylindrical outer walls. This disk is inserted into that portion of bore 105 which cooperates in forming the dry chamber 107 against the shoulder therein which is adjacent the upper end of wet chamber 106. An O-ring seal 124 which is contained within an annular groove in the bore 105 adjacent the shoulder engages the cylindrical outer wall of the disk 123 and seals it to the bore. The disk 123 is retained against axial movement in bore 105 by a washer and a snap ring, the latter being seated in an annular groove in the wall of bore 105. Disk 123 is also provided with a central axial bore through which operating rod 119 extends. An O-ring 126 is inserted in a groove adjacent the top of the bore in disk 123 through which the operating rod extends and is held therein by the bottom surface of the washer. The rod 119 does not contact either the disk 123 or the washer and is supported solely by O-ring 126. By these means rod 119 is sealed with guide assembly 108 in a substantially frictionless manner, because the axial motion of rod 119 is generally in the nature of not more than two thousandths of an inch, under which conditions O-ring 126 forms an anti-friction bearing, since it tends to roll upon the rod as the latter is reciprocated.

The upper end of dry chamber 107 is closed by the previously mentioned flexible boot 109 which is inserted into bore 105 against a shoulder therein. An expansible type coil spring 127 retains boot 109 in bore 105, and the boot is provided with a thickened elastic central portion having a bore which surrounds and sealingly grips a nonmagnetic brass shaft 128 which carries rod 119.

Body element 95 is cast of an non-magnetic material such as aluminum, and is bored to receive a core 129 in which the coil 114 and thermistor 115 of the transducer assembly are housed. Core 129 and an armature disk 130 which is positioned above it are preferably formed of material which has high magnetic permeability and low hysteresis such as an ingot iron. Core 129 is a cup-shaped cylinder having side walls 131 which provide magnetic poles and a hollow center post 132 which also provides magnetic poles. Coil 114 is embedded in an insulating plastic material in the core 129, while thermistor 115 is embedded in the same plastic material in a notch-like opening formed in the bottom of the core 129. The outside diameter of the core 129 is such as to establish a close slidable fit with bore in body element 95, and the core is provided with a peripheral flange 133 which abuts a shoulder on body element 95. Flange 133 of core 129 is clamped to body element 95 by a snap ring in a groove in body element 95.

The electromagnet above described including core 129 and coil 114 operates an armature including disk 130. This disk has a hollow hub 135 into which a tube 136 of nonmagnetic material is pressed. The armature disk 130 extends over the outside magnetic poles formed by the side walls 131, and tube 136 extends freely through the center post or poles 132 of core 129. The armature disk 130 does not contact body element 95. Shaft 128 fits snugly but axially slidably within tube 136 of the armature and its upper end is abutted by an adjusting screw 137 which is threaded into the upper end of tube 136 and which is provided with a locking nut 138. An externally threaded hollow plug 140 covering screw 137 and nut 138 is threaded into body member 95. Rotation of core 129 and armature disk 130 with respect to each other and body element 95 is prevented by a nonmagnetic pin 141 which extends through disk 130 into aligned openings in body element 95 and core 129. The opening in the armature disk 130 through which pin 141 extends is of a diameter larger than that of pin 141 so that should disk 130 contact the pin during operation of the device there will be substantially no frictional resistance between them. Pin 141 extends through disk 130 to hold it against rotation during adjustment of screw 137 and nut 138.

It is to be understood that while the above described pilot valve comprises a preferred construction, the principles of the invention are not limited to that specific valve and other specific types of electrically operated pilot valves are within the scope of the invention.

As will be explained, the armature assembly of the transducer is electromagnetically urged in a direction to close valve 100, 118 and is urged in the opposite direction by fluid pressure acting upon the bottom surface of the head 120 of valve element 118. When this fluid pressure overcomes a predetermined electromagnetic force of the transducer, the valve will be opened to a position whereat the fluid forces acting upon element 118 exactly counterbalance the counteracting electromagnetic force. Should the fluid forces acting upon valve element 118 vary in even the slightest degree, then the opening through the valve 100, 118 will be varied to maintain a desired pressure drop between inlet port 100 and outlet bore 104. It has been found during repeated tests and in the actual operation of pilot valve 13 that the valve does not tend to hunt when the electric current supplied to its coil or the pressure conditions in inlet port 100 are changed, and that the valve responds quickly even to sudden changes in electric current and/or pressure.

The force exerted by an electromagnet on an armature spaced from it is inversely proportional to the square of the distance between the armature and the poles of the magnet for a constant magnetomotive force. For this reason the coil 114 and core 129 of the transducer are preferably made large in order that there may be a wide air gap between the armature disk 130 and the poles 131 and 132, whereby in that range (0–.002 inch) in which the armature moves, the force acting upon the armature will remain substantially constant for any given magnetomotive force produced by the coil 114, and the transducer will deliver a substantially constant force within its predetermined stroke range in response to that magnetomotive force.

Coil 114 will tend to heat up under typical conditions of operation, which normally is accompanied by an increase in its resistance. Since this increase in coil resistance would diminish coil current and thereby cause the electromagnetic flux of the coil to decrease, thermistor 115 is preferably included in series with coil 114 by connection with coil lead 142. A resistor $R_T$ is connected in parallel with thermistor 115 between leads 142 and 144. The combination of coil 114, thermistor 115, and resistor $R_T$ presents a combined resistance between coil leads 143 and 144 which varies only a minimal amount with temperature, so that the overall resistance through which the pilot valve current passes is substantially constant. The combination of resistance elements will thus be understood to be equivalent to a temperature constant resistance.

*The electrical control circuit of FIGURE 2*

FIGURES 2, 3 and 5 each show a preferred electrical circuit 14 whereby the pilot valve 13 may be accurately controlled to maintain any flow within a desired operating range. It is to be understood that while the circuit shown forms the preferred means for energizing the pilot valve 13, the valve may be used with any other suitable source of electrical power.

The circuit 14 is designed to operate on conventional 110 volt, 60 cycle alternating current, is relatively simple and compact, and enables the operation of the pilot valve to be easily, accurately, and remotely controlled over its entire operating range. The circuit includes a power supply which is shown at the lower left portion of the figure. This power supply provides a regulated or constant direct current output at points 145 and 146. Power supply leads 147 and 148 are connectable to a conventional source of alternating current not shown.

A resistor $R_L$ is connected between lead 147 and a junction 150. A diode $D_1$, permitting current to flow to the right, is connected between junction 150 and a second junction 151, while reversely oriented diode $D_2$, permitting current flow to the left but not the right, is connected from junction 150 to a junction 152. Condenser $C_1$ is connected from junction 151 to lead 148, and condenser $C_2$ is connected in series with condenser $C_1$ from lead 148 to junction 152. Resistor $R_1$ is connected from junction 151 to the plate connection 153 of a voltage regulator tube VR. Junction 152 is connected by a lead 154 to the cathode connection 155 of tube VR.

In operation, condensers $C_1$ and $C_2$ are charged through diodes $D_1$ and $D_2$ on opposite half-cycles of the input current, so that a relatively high, fluctuating potential tends to be established between junctions 151 and 152. The voltage regulator tube VR regulates this potential so that a lower, substantially constant potential is supplied at points 145 and 146, the former being positive with respect to the latter.

Referring now to the preferred control circuit itself, which appears to the right of the power supply, leads 158 and 159 are connectable to a conventional source of alternating current, as by respective connection to leads 147 and 148. Lead 158 is connected to a variable resistor $R_2$ which has an adjustable tap 160. Tap 160 is connected to one end of the primary winding of a transformer T, the other end of the primary being connected to lead 159.

A variable resistor $R_3$ having an adjustable tap 161 is connected at one end to the power supply at 145, tap 161 being connected to a junction 162. A variable resistor $R_4$ having a tap 163 is connected to the power supply at 146 through a lead 164. Tap 163 of resistor $R_4$ is connected to junction 162, and a condenser $C_4$ is connected between junction 162 and lead 164. The secondary winding of the transformer is connected at one end to lead 164 and at the other end to lead 144. The respective taps 160, 161 and 163 of resistors $R_2$, and $R_3$, and $R_4$ are ganged as shown for simultaneous movement.

Junction 162 is connected through a diode $D_3$, which permits current flow to the right but not to the left, to a lead 165. Between lead 165 and coil lead 143 there are connected in parallel a number of variable resistors $R_a$, $R_b$, $R_c$, $R_d$, and $R_e$, each resistor having a switch $SW_a$, $SW_b$, $SW_c$, $SW_d$, and $SW_e$, respectively connected in series with it between leads 143 and 165. The taps of these resistors are respectively designated 166, 167, 168, 169, and 170. These taps are preset so that by selectively closing any of switches $SW_a$-$SW_e$, current will flow from lead 165 to lead 143 through a resistor $R_a$-$R_e$ of predetermined resistance.

The operation of the pilot valve control circuit 14 may now be explained. When energized, direct current from the power supply flows from positive connection 145 through resistor $R_3$ to tap 161, through lead 165 to whichever switch $SW_a$-$SW_e$ has been closed, through the resistor connected in series with that switch to lead 143 and coil 114. From the coil, the current flows through parallel-connected thermistor 115 and resistor $R_T$ to lead 144, then through the secondary winding of transformer T and lead 164 to negative connection 146 of the power supply. The magnitude of this current may be varied by adjusting variable resistors $R_3$ and $R_4$.

The application of an alternating potential to the primary leads of transformer T induces an alternating potential in the secondary winding of the transformer which is super-imposed on the direct voltage applied to the coil 114. This alternating voltage is applied to the circuit through lead 164, condenser $C_4$ or tap 163 depending on the position of the tap along resistor $R_4$ diode $D_3$, leads 165 and 143, valve coil 114, through thermistor 115 and resistor $R_T$, and transformer secondary lead 144.

By reason of the superimposition of the alternating potential or voltage established by the transformer on the direct voltage established by the power supply, the current in coil 114 becomes a modulated or fluctuating direct current which causes the coil flux to fluctuate very rapidly about an average value and thereby minimizes or narrows the range of hysteretic variation of the core material. By adding an alternating potential or voltage component to the direct voltage, the valve response variation due to hysteresis of the core 129 may be greatly reduced, to as little as plus or minus one half of one percent or less. The average direct voltage establishes the setting of the valve, while the alternating potential or voltage is effective to minimize the deviation about that setting which is due to the hystsresis of the core material of the transducer. Because it is desirable, in connection with the particular pilot valve 13 shown for purposes of illustration, to use a relatively large alternating potential or voltage with a low direct current component of total current and to use a relatively smaller alternating potential or voltage with a higher direct current component, the resistor $R_2$, $R_3$, and $R_4$ are ganged as shown so that the modulating voltage will be automatically reduced as the direct voltage is increased. Thus, as the taps are moved downwardly on the resistors the direct current is reduced while the alternating component is increased. While this ganging arrangement is preferred, independently adjustable variable resistors might be used or a single resistor might be substituted in place of the two separate resistors $R_3$ and $R_4$.

From the foregoing, it can be seen that the control circuit 14 is effective to supply a current to the valve coil 114 such that the magnitude of the flux established by the coil accurately determines the downward electromagnetic force exerted on the operating rod 119. This force, in turn, determines the pressure drop across valve 100, 118.

*Operation of the system of FIGURE 2*

With this description in mind, the operation of the hydraulic system of FIGURE 2 may be described.

Fluid under pressure from conduit 24 enters the flow metering assembly 12 through inlet port 25. The fluid exerts a downward pressure, through port 44 and passageway 60, on the upper face of head 47 of compound piston element 46. This same pressure is also applied to the upper end of shank 48 through bore 53 which communicates at its lower end with the chamber above the upper face of poston head 47. Thus, the pressure of fluid in port 44 is applied downwardly over an area equal to the area of the lower face of piston head 47. Depending upon the pressure of fluid in the chamber beneath piston head 47, which together with spring 55 exerts a counteracting upward force, piston 46 is moved downwardly in bore 42 to a position at which the valve formed by port 44 and land 52 is open, so that a portion of the flow in conduit 24 is directed through groove 50 to port 43, and then through groove 38 and bore 86 to tank port 31 and tank 18 through conduit 30. It is the axial position of the sharp upper end of land 52 with respect to port 44 that determines, under given pressure conditions, the proportion of inlet flow which will be returned to tank and the proportion which will be applied to the variable orifice mechanism in bore 35.

As previously indicated, when the system is in operation a constant flow is maintained at the load port 27 of flow metering assembly 12 regardless of pressure fluctuations either at inlet port 25 or at load port 27. It is the pressure compensator or regulator mechanism in bore 34 which is responsible for this action and it is the variable orifice in bore 35 that directly meters the volumetric flow to the load 11. A main function of the pressure compensator is to insure that a constant pressure differential is always maintained across the variable orifice between bore 88 and outlet port 27.

Fluid enters the variable orifice mechanism from bore 88 to groove 62 and port 69. With the compound piston 72 in the position shown in FIGURE 2, land 76 closes port 69 and no fluid is permitted to flow to load port 27. However, when the balance of forces acting on piston 72 is such that the piston is moved upwardly so that valve 69, 76 is open, port 69 communicates with groove 75, and fluid passes through groove 75, port 70, groove 63, load port 27 and conduit 26, and is returned to tank 18 from the motor 11 through conduit 28. It is the pilot valve 13 which determines the balance of forces acting on the opposed control surfaces of compound piston 72, as will now be explained.

Assume that the balance between the downwardly acting force of the transducer and the upwardly acting hydraulic force on valve element 118 is such that valve 100, 118 is partially open. With the valve 100, 118 in this attitude, fluid flows from groove 62 of the variable orifice mechanism to pilot port 89, through conduit 98 to inlet port 100 and into wet chamber 106, past the sharp flange 121 of poppet 118 to outlet passageway 104 which is connected to tank conduit 30. Restricted orifice 99 in bore 98 limits the volume of fluid thus passing through the pilot valve to tank.

Valve 100, 118 restricts the passage of fluid from port 100 to outlet passageway 104 so that a back pressure is established at port 100. The pressure at port 100 is applied through bore 102 to the control surface comprised by the underneath side of piston head 73. This pressure is also applied through drilling 80 and bore 79 to the lower end of shank 74. The pressure of fluid in the control chamber above piston head 73 is at all times substantially equal to tank pressure because that chamber communicates directly with tank 18 through port 31 and conduit 30. Only the high rate spring 81 acts to oppose the upward force of the fluid pressure on the underside of the piston head 73, and this spring provides a downwardly acting force on the piston head which increases as the piston is moved upwardly. Therefore, the piston is moved upwardly, releasing fluid through port 69, to a position at which the downward force of spring 81 balances the upward force of the fluid on the underside of piston head 73. Thus, from what has been said, it will be seen that the pressure drop across valve 100, 118, determines the area of the orifice formed by valve elements 69, 76. Since the pressure drop across valve 100, 118 is controlled by the current applied to the pilot valve, merely by controlling the magnitude of that current the area of this orifice, and consequently the flow through it to load port 27, can be controlled.

The pressure at load port 27 is reflected in the chamber beneath piston head 47 through transverse bore 87. This pressure, together with the force of spring 55, acts on piston 46 to cause valve 44, 52 to maintain a constant pressure difference across the variable orifice 69, 76, whereby a constant flow through the orifice will be maintained for any given position of land 76 with respect to port 69. If, for example, the pressure at port 27 rises due to resistance encountered in the work load, this high pressure is reflected backwardly across orifice 69, 76 to port 44 and momentarily causes a greater flow through valve 44, 52 to tank, so that less fluid passes through the orifice 69, 76. Since less fluid is passing through this orifice, the pressure drop across it becomes smaller. A relatively larger force is thereby applied to the underside of piston head 47, so that piston 46 is urged upwardly, reducing the flow to tank and directing a greater flow to orifice 69, 76, so that the original pressure drop across that orifice is re-established and the desired flow to the motor is maintained.

When no current is applied to the valve coil 114, the valve 100, 118 is wide open; substantially no pressure drop occurs across it, and the pressure in bore 102 is substantially tank pressure. Spring 81 then forces piston 72 to the position shown in FIGURE 2, in which port 69 is closed, and the flow to the fluid motor is cut off. The lower pressure at port 27 is reflected through bore 87 to the chamber below piston head 47, so that the high pressure acting downwardly on the piston fully opens valve 44, 52, and all flow is diverted to tank. Thus, for any given current applied to it, the pilot valve 13 will control the flow from the flow control assembly to the output or load conduit 26.

The settings of the resistors $R_a$–$R_e$ determine the maximum current that can flow in valve coil 114 upon closure of the corresponding switches $SW_a$–$SW_e$, and thus in effect determine the various ranges of flows obtainable from the system. For example, with switch $SW_a$ closed, a relatively large maximum current can flow to coil 114. Since maximum valve current corresponds to maximum flow in conduit 26, closure of switch $SW_a$ will permit the highest maximum flow, and the widest flow range. The particular flow actually permitted by the pilot valve in that range depends upon the setting of the ganged resistors $R_2$, $R_3$, and $R_4$. By setting these resistors to present maximum resistance to the D.C. component of current, substantially zero flow will be permitted; by changing the resistances $R_2$–$R_4$ so that smaller resistances to the D.C. component of current are presented, larger flows up to the maximum permitted by resistor $R_a$ are obtained. Alternatively, by closing one of the other switches $SW_b$ to $SW_e$, successively smaller maximum currents to the pilot valve 13 are permitted so that successively smaller flow ranges are established.

While I have described a preferred embodiment of my invention, it will be understood that the invention is not limited to the use of the particular flow metering mechanism illustrated, nor the specific pilot valve illustrated, nor the circuit 14 illustrated, and that the invention includes the use of other pressure compensators, variable orifice means, and transducer operated valves and/or circuitry within the scope of the claims which follow.

I claim:

1. Flow control apparatus for maintaining a predetermined rate of flow of fluid under pressure to a work load under variable pressure conditions, comprising, (a) variable orifice means, said variable orifice means comprising a body having a bore therein, an inlet port and an outlet port communicating with said bore at spaced positions, a movable valve member slidable in said bore, said member having a fluid passageway centrally formed therein which cooperates with one of said ports to form a variable orifice regulating the flow of fluid from said inlet port to said outlet port through said passageway, the area of said orifice changing as said valve member is moved axially, said member having opposed surfaces of equal areas presented to two opposed pressure control chambers defined in said bore, both said chambers being isolated from said passageway, inlet port and outlet port, there being no other surfaces of said member exposed to fluid pressure tending to move said member axially, and elastic means biasing said member in a direction tending to close said variable orifice, (b) pressure compensator means maintaining a pressure differential between fluid pressures at said inlet port and outlet port which is substantially constant for any given position of said member with respect to said body, and (c) electrically controllable means for establishing a pressure differential between the pressures of fluid in said two control chambers, said electrically controllable means having an inlet connected to one of said control chambers and an outlet connected to the other of said two control chambers and to a fluid drain, means including a flow restrictor connecting said inlet to a source of pressure fluid, the fluid force arising from the pressure differential established by said electrically controllable means being the sole pressure differential fluid force which is exerted on said movable member tending to move said movable member to vary the area of said orifice.

2. Flow control apparatus for maintaining a predetermined rate of flow of fluid under pressure to a work load under variable pressure conditions, comprising, (a) variable orifice means, said variable orifice means comprising a body having a bore therein, an inlet port and an outlet port communicating with said bore at axially spaced positions, a movable valve member slidable in said bore, said member having a fluid passageway centrally formed therein which cooperates with one of said ports to form a variable orifice regulating the flow of fluid from said inlet port to said outlet port through said passageway, the area of said orifice changing as said valve member is moved axially, said member having opposed surfaces of equal areas presented to two opposed pressure control chambers defined in said bore, both said chambers being isolated from said passageway, inlet port and outlet port, there being no other surfaces of said member exposed to fluid pressure tending to move said member axially, (b) pressure compensator means maintaining a pressure differential between fluid pressures at said inlet port and outlet port which is substantially constant for any given position of said member with respect to said body, and (c) electrically controllable means for establishing a pressure differential between the pressures of fluid in said two control chambers, said electrically controllable means having an inlet connected to one of said control chambers and an outlet connected to the other of said two control chambers and to a fluid drain, means including a flow restrictor connecting said inlet to said inlet port of said variable orifice means, the fluid force arising from the pressure differential established by said electrically controllable means being the sole pressure differential fluid force which is exerted on said movable member tending to move said movable member to vary the area of said orifice.

3. Flow control apparatus for maintaining a predetermined rate of flow of fluid under pressure to a work load under variable pressure conditions, comprising, (a) variable orifice means, said variable orifice means comprising a body having a bore therein, an inlet port and a work port communicating with said bore at axially spaced positions, a movable valve member slidable in said bore, said member having a fluid passageway centrally formed therein which cooperates with one of said ports to form a variable orifice regulating the flow of fluid from said inlet port to said work port through said passageway, the area of said orifice changing as said valve member is moved axially, said member having opposed surfaces of equal areas presented to two opposed pressure control chambers defined in said bore, both said chambers being isolated from said passageway, inlet port and work port, there being no other surfaces of said member exposed to fluid pressure tending to move said member axially, and elastic means biasing said member in a direction tending to close said variable orifice, (b) pressure compensator means maintaining a pressure differential between fluid pressures at said inlet port and work port which is substantially constant for any given position of said member with respect to said body, (c) a pilot valve having an inlet and an outlet, means including a fixed flow restrictor supplying fluid under pressure to said inlet, a movable valve element cooperable with a control port for establishing a pressure drop between said inlet and said outlet when fluid under pressure is applied to the inlet of said pilot valve, an electromechanical transducer for actuating said valve element relative to said control port to adjust said pressure drop in accordance with an electric signal applied to said transducer, and (d) passage means reflecting said pressure drop between the pressures of fluid in said two control chambers, the magnitude of said pressure drop thereby controlling the area of said variable orifice.

4. Flow control apparatus for maintaining a predetermined rate of flow of fluid under pressure to a work load under variable pressure conditions, comprising, (a) variable orifice means, said variable orifice means comprising a body having a bore therein, an inlet port and a work port communicating with said bore at axially spaced positions, a movable valve member slidable in said bore, said member having a fluid passageway centrally formed therein which cooperates with one of said ports to form a variable orifice regulating the flow of fluid from said inlet port to said work port through said passageway, the area of said orifice changing as said valve member is moved axially, said member having opposed surfaces of equal areas presented to two opposed pressure control chambers defined in said bore, both said chambers being isolated from said passageway, inlet port and work port, there being no other surfaces of said member exposed to fluid pressure tending to move said member axially, and elastic means biasing said member in a direction tending to close said variable orifice, (b) pressure compensator means for maintaining a constant pressure differential between fluid pressures at the inlet port and work port of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressures exerted in said control chambers, said first and second control chambers being the only control chambers pressure in which tends to operate said valve, means constantly exerting a force on said member in a direction tending to close said valve, fluid in said first control chamber being at the pressure of fluid at said inlet port and tending to move said member in a direction opening said valve against the pressure of fluid in said second control chamber, said inlet port communicating with the inlet port of said variable orifice means, said outlet port communicating with the first control chamber of said variable orifice means, said second control chamber communicating with the work port of said variable orifice means, and (c) a pilot valve having an inlet and an outlet, means including a flow restrictor supplying fluid under pressure to said inlet, a movable valve element cooperable with a control port for establishing a pressure drop between said inlet and said outlet when fluid under pressure is applied to the inlet of said pilot valve, an electromechanical transducer for actuating said valve element relative to said control port to adjust said pressure drop in accordance with an electric signal applied to said transducer, and passage means applying said pressure drop between said two control chambers of said variable orifice means.

5. Flow control apparatus for maintaining a predetermined rate of flow of fluid under pressure to a work load under variable pressure conditions, comprising, (a) variable orifice means, said variable orifice means comprising a body having a bore therein, an inlet port and an outlet port communicating with said bore at axially spaced positions, a movable valve member slidable in said bore, said member having a fluid passageway centrally formed therein which cooperates with one of said ports to form a variable orifice regulating the flow of fluid from said inlet port to said outlet port through said passageway, the area of said orifice changing as said valve member is moved axially, said member having opposed surfaces of equal areas presented to two opposed pressure control chambers defined in said bore, both said chambers being isolated from said passageway, inlet port and outlet port, there being no other surfaces of said member exposed to fluid pressure tending to move said member axially, and a high rate spring biasing said member in a direction tending to close said variable orifice, (b) pressure compensator means maintaining a constant pressure differential between fluid pressures at the inlet port and outlet port of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressures exerted solely in said control chambers, a low rate spring urging said member in a direction tending to close said valve, fluid in said first control chamber being at the pressure of fluid at said inlet port and tending to move said member in a direction opening said valve against said spring and the pressure of fluid in said second control chamber, said inlet port communicating with the inlet port of said variable orifice means, said outlet port communicating with the first control chamber of said variable orifice means, said second control chamber communicating with the outlet port of said variable orifice means, and (c) an electrically controlled pilot valve for establishing a differential between the pressures of fluid in the second and first control chambers of said variable orifice means, said pilot valve having an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, a fluid passageway including a flow restrictor communicating between the inlet of said pilot valve and the inlet port of said variable orifice means, a passageway communicating between said control port and said second control chamber of said variable orifice means, and a passageway communicating from the outlet of said pilot valve to the first control chamber of said variable orifice means and a fluid drain, the pressure drop established by said pilot valve and applied between the second and first control chambers of said variable orifice means constituting the only pressure differential acting on the movable member of the variable orifice means tending to vary the area of said orifice, the movable members of said variable orifice means and pressure compensator means being of similar construction and each forming a spool valve with its respective inlet port.

6. Flow control apparatus for maintaining a predetermined rate of flow of fluid under pressure to a work load under variable pressure conditions, comprising, (a) variable orifice means, said variable orifice means comprising a body having a bore therein, an inlet port and an outlet port communicating with said bore at axially spaced positions, a movable valve member slidable in said bore, said member having a fluid passageway centrally formed therein which cooperates with one of said ports to form a variable orifice regulating the flow of fluid from said inlet port to said outlet port through said passageway, the area of said orifice changing as said valve member is moved axially, said member having opposed surfaces of equal areas presented to two opposed pressure control chambers defined in said bore, both said chambers being isolated from said passageway, inlet port and outlet port, there being no other surfaces of said member exposed to fluid pressure tending to move said member axially, and elastic means biasing said member in a direction tending to close said variable orifice, (b) pressure compensator means maintaining a pressure differential between fluid pressures at said inlet port and outlet port which is substantially constant for any given axial position of said member with respect to said body, and (c) adjustable control valve means for establishing a pressure differential and reflecting said differential between the pressures of fluid in said two control chambers, said control valve means having an inlet connected to the one of said control chambers and an outlet connected to the other of said control chambers, and means including a flow restrictor connecting said inlet to source of pressure fluid, the fluid force arising from the pressure differential established by said control valve means being the sole pressure differential fluid force which is exerted on said movable member tending to move said movable member to vary the area of said orifice.

References Cited by the Examiner

UNITED STATES PATENTS

| | | | |
|---|---|---|---|
| 1,754,250 | 4/30 | Wright | 137—489 |
| 2,853,096 | 9/58 | Lee | 137—491 |
| 2,957,488 | 10/60 | Farkas | 137—117 |
| 2,986,161 | 5/30 | Renick | 137—501 |
| 3,105,671 | 10/63 | Teitelbaum et al. | 251—30 |

M. CARY NELSON, *Primary Examiner.*

MARTIN P. SCHWADRON, *Examiner.*